April 4, 1961 R. T. BUNDORF 2,978,254
INTERCONNECTED FLUID SUSPENSION SYSTEM
Filed Sept. 9, 1958 2 Sheets-Sheet 2

INVENTOR.
Ronald T. Bundorf
BY
W. H. Wagner
ATTORNEY

United States Patent Office 2,978,254
Patented Apr. 4, 1961

2,978,254

INTERCONNECTED FLUID SUSPENSION SYSTEM

Ronald T. Bundorf, Royal Oak, Mich., assignor to General Motors Corporation, Detroit, Mich., a corporation of Delaware Filed Sept. 9, 1958, Ser. No. 759,937

3 Claims. (Cl. 280—104)

This invention relates to fluid suspension for vehicles and more particularly to fluid suspension of the type wherein the springs for the front and rear wheels at the same side of the vehicle are arranged in communicating relation.

An object of the invention is to provide an improved suspension system for vehicles.

Another object is to provide an improved fluid suspension for vehicles.

A further object is to provide an improved fluid spring construction.

A still further object is to provide an interconnected fluid suspension for vehicles.

Still a further object is to provide an interconnected fluid suspension for vehicles incorporating automatic means for increasing pitch stability under certain conditions of vehicle operation.

Still another object is to provide a fluid spring system for vehicles comprising primary springs for each front and rear wheel interconnected in fore and aft relation and independent helper springs associated with the wheels at one end of the vehicle, and including height sensing devices adapted to control the flow of fluid into and out of the springs so as to maintain the sprung mass of the vehicle at a predetermined height above the ground.

Yet a further object is to provide an arrangement of the stated character wherein height sensing means disposed between the sprung mass and the front wheels of the vehicle operate to control fluid movement in the interconnected springs and the height sensing means disposed between the sprung mass and the rear wheels of the vehicle operate to control fluid movement in the helper springs.

Still a further object is to provide a fore and aft interconnected fluid suspension arrangement incorporating acceleration responsive control means operative to disable fluid flow between the interconnected springs during conditions of vehicle acceleration and deceleration.

A still further object is to provide a fluid spring assembly for use in an interconnected system which incorporates therein pressure responsive means for selectively controlling fluid flow between the interconnected springs.

These and other objects, advantages, and features of the invention will become more fully apparent as reference is had to the accompanying specification and drawings wherein.

Figure 1:
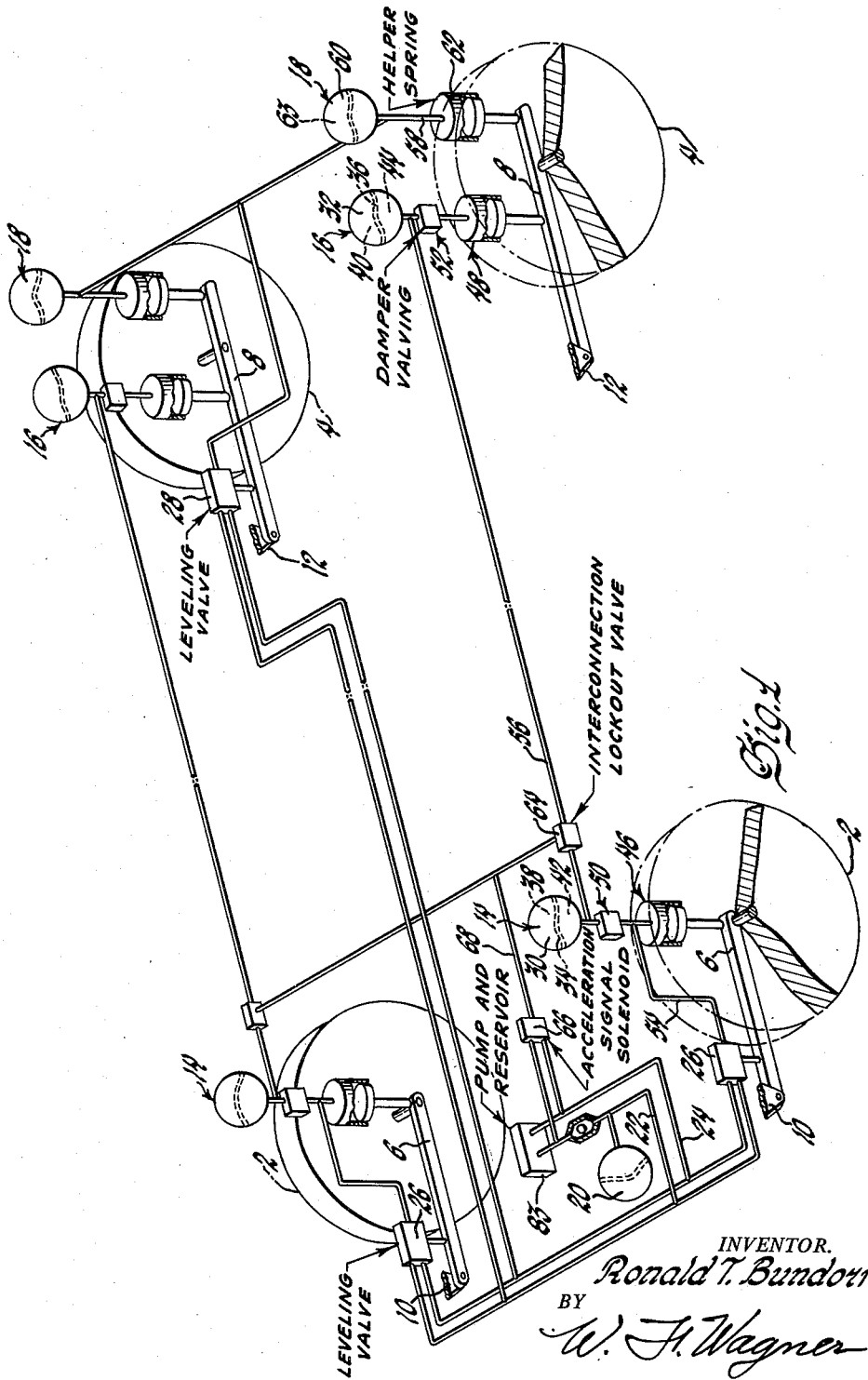
Fig. 1 is a perspective schematic view of a fluid suspension system incorporating the present invention.

In Fig. 1, there is illustrated schematically a vehicle suspension arrangement which is adapted to support the sprung mass of a vehicle, not shown, with respect to the vehicle front wheels 2 and rear wheels 4. Wheels 2 and 4 may be connected to the sprung mass in any suitable manner. However, for the purposes of illustration, they are shown rotatably supported on front trailing arms 6 and rear trailing arms 8. It will be understood that the fragmentary portions 10 and 12 to which arms 6 and 8 are pivoted, form a part of the vehicle frame, not shown.

In order to resiliently support the vehicle sprung mass, a pair of hydropneumatic springs 14 and a pair of hydropneumatic springs 16 are interposed between the sprung mass and the trailing arms 6 and 8 of front wheels 2 and rear wheels 4, respectively. In addition to springs 14 and 16, a pair of hydropneumatic springs 18 are interposed between the sprung mass and rear trailing arms 8. Springs 14 and 16 constitute the primary suspension of the vehicle while spring 18 function mainly to correct unbalanced fore and aft loading of the sprung mass. Each of springs 14, 16, and 18 is connected to a pump charged hydraulic pressure accumulator 20 by means of a fluid circuit comprising pressure lines 22 and exhaust lines 24. Interposed in lines 22 and 24 between springs 14 and accumulator 20 are a pair of leveling valves 26, while a single leveling valve 28 is interposed in lines 22 and 24 between the accumulator and helper springs 18. Leveling valves 26 and 28 function to introduce and exhaust fluid into and out of springs 14, 16, and 18 so as to maintain the vehicle sprung mass at a predetermined vertical level or trim height. Since such valves are well known in the prior art, detailed description thereof is omitted, it being understood that each is actuated by movement of the associated trailing arm and deflection of the latter above a predetermined position allows fluid movement from pressure line 22 to the associated spring or springs, while deflection of the arm below the predetermined position allows fluid movement from the springs to the pump and reservoir through exhaust line 24.

Inasmuch as the essential features of construction and function of the system disclosed are identical for both the right and left side of the vehicle, the description which follows is made with reference to the left side only, it being understood that such description applies equally to the right side of the vehicle.

As seen in Fig. 1, primary suspension springs 14 and 16 are comprised of spherical casings 30—32 having a diaphragm partition 34—36 providing an upper gas filled gas filled chamber 38—40 and a lower hydraulic fluid chamber 42—44 communicating with a wheel actuated piston and cylinder assembly 46—48 via connecting portions 50—52. Portion 50 of spring 14 communicates with the leveling valve 26, previously mentioned, by means of conduit 54 and each of portions 50—52 incorporate damper valving (Fig. 3) which operates to restrict rate of flow of fluid between chambers 42—44 and piston cylinder assemblies 46—48 and thus function as shock absorbers.

In accordance with one feature of the invention, a conduit 56 extends longitudinally between springs 14 and 16 connecting the lower chambers 42 and 44 thereof in communicating relation in a manner bypassing the damper valving in both connecting portions 50—52. As a result of the communication effected by conduit 56, deflection force at either wheel 2 or 4 is distributed equally between springs 14 and 16. For example, when wheel 2 strikes a bump causing upward deflection thereof, hydraulic fluid is forced from the front piston and cylinder assembly 46 upwardly through the damper valving of connecting portion 50. Since the gas pressure in each of upper chambers 38 and 40 is equal, the fluid displaced by piston and cylinder assembly 46 enters chambers 42 and 44 in equal amounts, thereby causing increased equal pressure in the gas filled portions 38 and 40. This increase in pressure of the gas filled portions is felt at both ends of the vehicle as a lifting force on the sprung mass.

Since the forces are equally distributed front and rear, pitching motion of the sprung mass normally induced by deflection of one wheel only, is diminished.

Inasmuch as the sprung mass of the vehicle supported in the manner just described is unstable with respect to its transverse axis, helper spring 18 is interposed in parallel with rear primary spring 16 to maintain the vehicle in a level attitude when sustained fore and aft load unbalance exists.

As will be apparent from Fig. 1, spring 18 is structurally similar to springs 14 and 16 except for the absence of damper valving in the connecting portion 58 between casing 60 and piston and cylinder assembly 62. However, since the sole function of helper spring 18 is to correct sustained load unbalance fore and aft of the vehicle, it is desirable that the average rate of spring 18 be substantially less than the average rate of primary springs 14 and 16 so that the former will not generate forces high enough to adversely influence the equalizing function of the primary suspension. This relationship may be accomplished in any suitable manner, as for example by utilizing a lower gas pressure in upper chamber 63 of casing 60 than that which exists in upper chambers 38 and 40 of springs 14 and 16, or alternatively, by reducing the size of piston and cylinder assembly 62 in proportion to the size of the corresponding assemblies of the primary springs.

Figure 3:
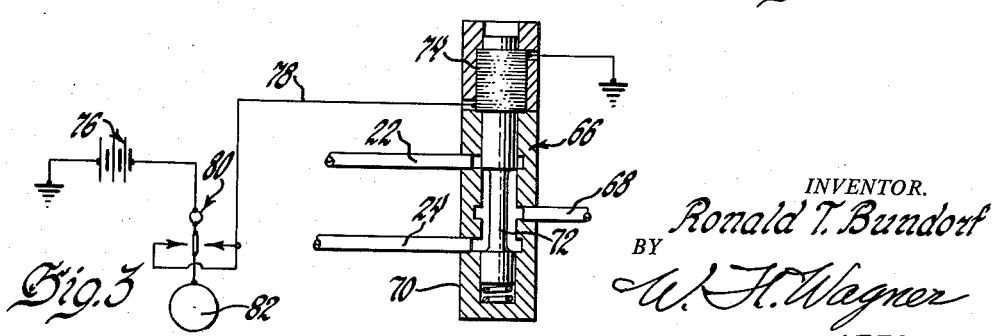
Fig. 3 is a schematic view illustrating the structure and mode of operation of the acceleration responsive lockout device associated with the invention.

Inasmuch as rapid acceleration or braking tends to disturb the center of gravity of a vehicle sufficiently to cause inclination of the vehicle sprung mass and attendant free flow of hydraulic fluid from the front spring to the rear springs or vice versa, according to a principal feature of the invention, means are provided for automatically disabling fluid intercommunication between chambers 42 and 44 during acceleration or braking, thereby increasing pitch stiffness as long as the abnormal condition exists. To this end, a fluid pressure actuated lockout valve 64 is interposed in interconnecting conduit 56. Assembly 64 is arranged in fluid communication with an acceleration responsive control valve assembly 66 by means of conduit 68. Assembly 66 in turn is connected to fluid pressure and exhaust lines 22 and 24. As seen in Fig. 3, assembly 66 includes a valve body 70 having a spool valve 72 which is adapted to be moved linearly by a solenoid 74 from a normal position blocking flow of fluid to lockout valve 64, to an operating position permitting fluid flow to lockout valve 64. Solenoid 74 is connected to a current source 76 by an electrical circuit 78 which includes an acceleration sensitive switch assembly 80. In the illustrated embodiment, assembly 80 takes the form of a pendulum 82 which is swingable from a neutral position to opposite circuit closing positions energizing solenoid 74. Under normal conditions of vehicle operation, that is when the vehicle is level, hydraulic fluid is prevented from flowing to lockout valve 64. Therefore, lockout valve 64 remains in open position permitting free fluid communication between springs 14 and 16. However, upon acceleration or braking of the vehicle, spool valve 72 is moved to a position allowing passage of fluid under pressure from accumulator 20 into conduit 68 thereby moving lockout valve 64 to closed position blocking conduit 56 and preventing intercommunication between springs 14 and 16 as long as switch 80 remains in either of the closed positions. As soon as the lifting or diving tendency ceases, switch 80 returns to neutral, allowing fluid in conduit 68 to discharge through exhaust line 24 to pump and reservoir 83, whereupon lockout valve 64 opens and intercommunication between springs 14 and 16 resumes.

Figure 2:
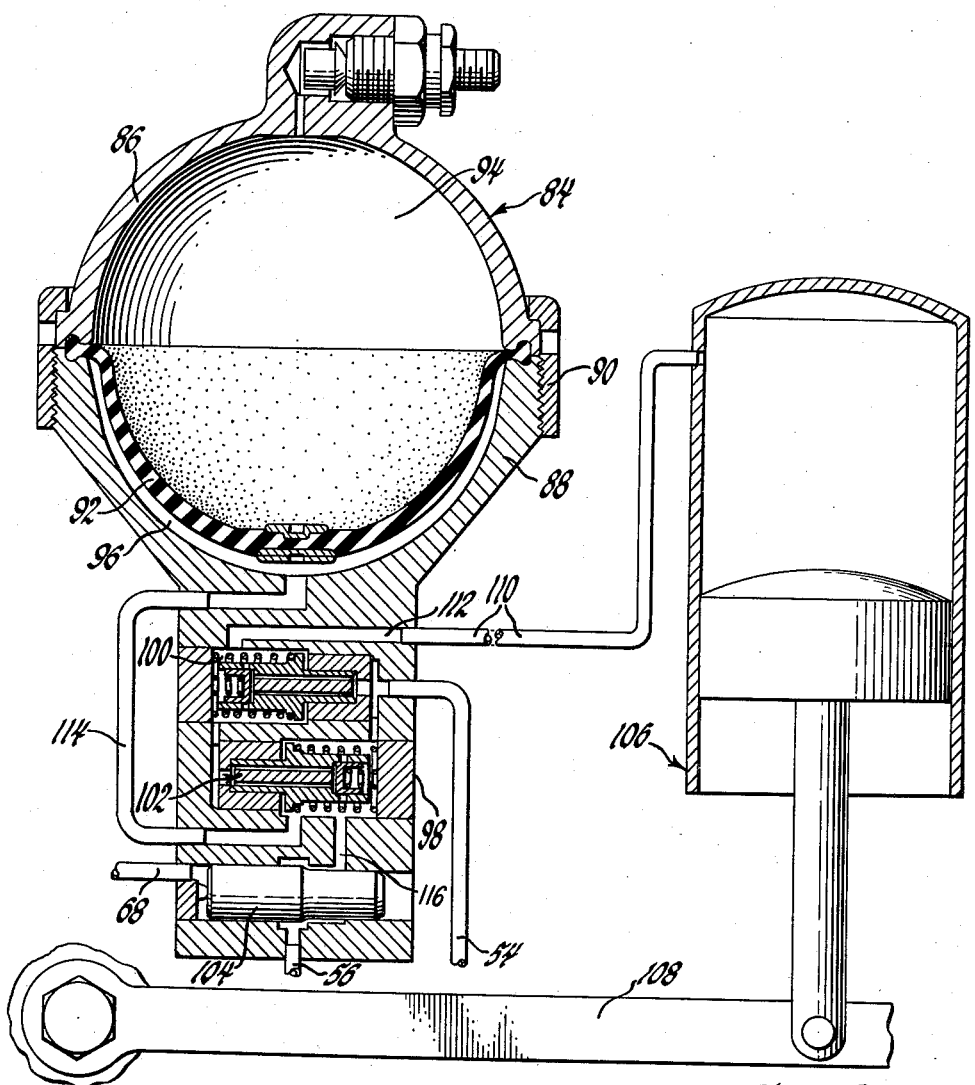
Fig. 2 is an enlarged view, partly in section, illustrating the details of construction of a fluid spring assembly for use in conjunction with the present invention.

In Fig. 2, there is illustrated a preferred form of the hydro-pneumatic spring depicted schematically in Fig. 1. In the embodiment illustrated, a spring casing 84 is formed of an upper hemipherical portion 86 and a lower hemispherical portion 88 which are clamped together in abutting relation by a threaded collar 90. Prior to assembly, a flexible diaphragm or membrane 92 is disposed between portions 86 and 88 to provide a flexible wall dividing the casing into an upper compartment 94 containing gas under pressure, and a lower compartment 96 adapted to receive hydraulic fluid. Lower portion 88 includes an integral depending body portion 98 forming a valve body having damper valves 100 and 102 disposed therein, which, respectively, control flow rate of fluid entering compartment 96 and emerging therefrom. In addition to housing damper valves 100 and 102, depending body portion 98 also has disposed therein a plunger type lockout valve 104, similar in function to lockout valve 64 previously referred to in connection with Fig. 1, which is arranged in circuit between interconnecting conduit 56 and fluid compartment 96 of casing 84. Adjacent to but physically separated from spring casing 84 is a piston and cylinder assembly 106, which in the embodiment shown, is arranged to react between trailing suspension arm 108 and any suitably vertically adjacent point on the vehicle frame, not shown. Fluid communication between compartment 96 of casing 84 and piston and cylinder assembly 106 is accomplished by means of a conduit 110 which connects to a passage 112 in lower body portion 98 leading to damper valves 100 and 102. Fliud displaced from piston and cylinder assembly 106 enters passage 112, passes through damper valve 102, emerges into conduit 114 and enters lower fluid compartment 96 of casing 84. When moving in the opposite direction, fluid displaced from compartment 96 enters conduit 114, passes through damper valve 100, emerges into passage 112 and re-enters piston and cylinder assembly 106 through conduit 110. It will be noted that communication between fluid compartment 96 and interconnecting conduit 56 is provided by a branch passage 116 connecting with passage 114 which bypasses the flow path in which damper valves 100 and 102 are interposed. Accordingly, when plunger valve 104 is in the leftwardly displaced position illustrated, fluid flow between fluid chamber 96 and the corresponding fluid chamber of the spring casing for the other wheel of the same side of the vehicle is not influenced by the damper valves of the spring for the other wheel. Therefore, fluid displaced from the piston and cylinder assembly through the damper valve for one wheel flows equally into compartments 96 of both springs without delay.

Although the invention has been described with reference to a specific embodiment thereof, it will be apparent that numerous changes and modifications may be made therein without departing from the scope of the invention. It is, therefore, to be understood that it is not intended to limit the invention to the embodiment shown but only by the scope of the claims which follow.

What is claimed is:

1. In a fore and aft interconnected fluid suspension for vehicles, a pair of fluid springs each comprising a casing defining a diaphragm partitioned closed cavity having compressible gas on one side thereof and incompressible fluid on the other side, a body portion integral with said casing defining passage means communicating with the incompressible fluid cavity and including damper valve structure, a fluid pressure and fluid exhaust circuit communicating with said last mentioned means, height sensing valve means in said circuits operative to control fluid flow into and out of said incompressible fluid cavity, a circuit bypassing said damper valves and providing fluid communication between the incompressible fluid cavities of both springs, and an acceleration responsive fluid pressure actuated device for temporarily blocking fluid flow through said bypass circuit.

2. In a fore and aft interconnected fluid suspension for vehicles, a pair of fluid springs each comprising a casing defining a diaphragm partitioned closed cavity having compressible gas on one side thereof and incompressible fluid on the other side, a body portion integral with said casing defining passage means communicating with the incompressible fluid cavity and including damper valve structure, a fluid pressure and fluid exhaust circuit communicating with said last mentioned means, height sensing valve means in said circuits operative to control fluid flow into and out of said incompressible fluid cavity, a circuit bypassing said damper valves and providing fluid communication between the incompressible fluid cavities of both springs, and a fluid pressure actuated device disposed in the body portion of one of said springs of each pair operative responsive to vehicle acceleration to block flow of fluid through said bypass passage.

3. In a fore and aft interconnected fluid suspension for vehicles, a pair of fluid springs each comprising a casing defining a diaphragm partitioned closed cavity having compressible gas on one side thereof and incompressible fluid on the other side, a body portion integral with said casing defining passage means communicating with the incompressible fluid cavity and including damper valve structure, a fluid pressure and fluid exhaust circuit communicating with said last mentioned means, height sensing valve means in said circuits operative to control fluid flow into and out of said incompressible fluid cavity, a circuit bypassing said damper valves and providing fluid communication between the incompressible fluid cavities of both springs, a fluid pressure actuated device disposed in the body portion of one of said springs of each pair operative responsive to vehicle acceleration to block flow of fluid through said bypass passage, and a fluid helper spring disposed between said frame and one wheel of each of said pairs to maintain said frame in level attitude when said fluid pressure actuated device is in unblocking position.

References Cited in the file of this patent

UNITED STATES PATENTS

| | | |
|---|---|---|
| 1,066,712 | Cooper | July 8, 1913 |
| 1,094,567 | Hofmann | Apr. 28, 1914 |
| 2,139,178 | Stevens | Dec. 6, 1938 |
| 2,644,699 | Weiertz | July 7, 1953 |
| 2,845,280 | Krotz | July 29, 1958 |

FOREIGN PATENTS

| | | |
|---|---|---|
| 1,153,847 | France | Oct. 14, 1957 |
| 601,731 | Great Britain | May 12, 1948 |